Aug. 24, 1943.  E. K. CARVER  2,327,765
MANUFACTURE OF VINYL RESIN FILM AND SHEETING
Filed Dec. 9, 1939
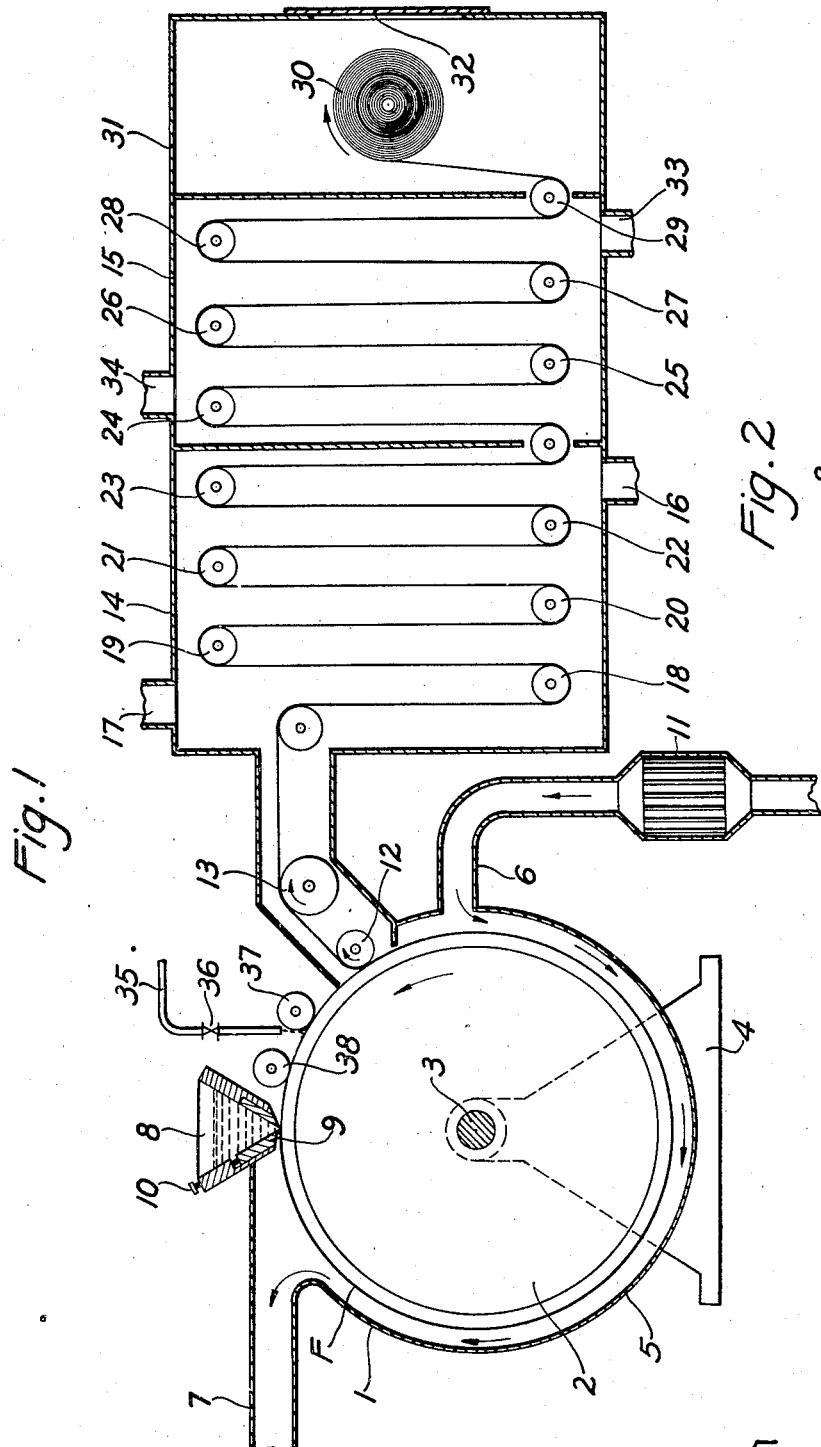
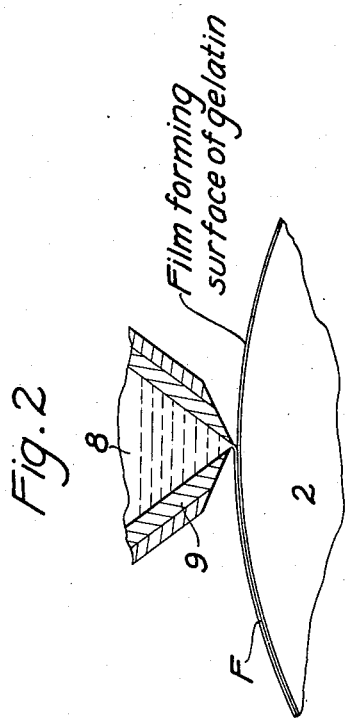
Emmett K. Carver
INVENTOR Patented Aug. 24, 1943

2,327,765

UNITED STATES PATENT OFFICE 2,327,765

MANUFACTURE OF VINYL RESIN FILM AND SHEETING

Emmett K. Carver, Rochester, N. Y., assignor to Eastman Kodak Company, Rochester, N. Y., a corporation of New Jersey Application December 9, 1939, Serial No. 308,500

2 Claims. (Cl. 18—57)

This invention relates to the production of film, sheeting, and other attenuated products from vinyl resins, and more particularly to a method of facilitating the removal of such products from surfaces upon which they have been formed.

In recent years, research carried on in connection with the production and use of vinyl resins has demonstrated that certain of these materials, particularly the acetals derived by condensing various aldehydes with polyvinyl alcohols or partially hydrolyzed polyvinyl esters may be employed satisfactorily in the manufacture of photographic film base, sheeting and other attenuated products. In general, it may be said that such resins are susceptible of being cast or extruded by a procedure analogous to that employed in the manufacture of film and sheeting from cellulose derivatives. However, due to their peculiar physical and chemical characteristics, particularly their inherent tendency to adhere to surfaces upon which they are cast from solution and their tendency to stretch when subjected to relatively slight tension at moderately elevated temperatures, many unusual and difficult problems are encountered when one attempts to apply known film-forming technique as practiced in the cellulose derivative industry to these resinous materials.

One of the most serious problems encountered in the manufacture of these resin films and sheeting by the customary wheel casting method is to bring the cast layer of resin into such a condition that it can be satisfactorily stripped from the film-forming surface. Vinyl resin films and sheeting are particularly difficult to strip without injury to the product. In the first place, under moderately elevated temperature, the material tends to adhere more firmly to the casting surface, particularly if the surface is of metal, and thus requires considerably more tension for its removal than is the case with cellulose derivatives. In the second place, this tension must be applied at a time when the resin layer contains a fairly considerable amount of solvent and is thus very elastic and in a particularly stretchy condition. The degree of stretch is also much higher in such films than in the case of the cellulose derivatives. For example, whereas a cellulose derivative film will be stretched, under ordinary circumstances, only a few per cent at stripping, a vinyl resin film, on the other hand, may stretch several hundred percent under the same or comparable conditions. Not only does this excessive stretch present many difficulties in the handling of the material during the subsequent curing operations, but it also ?s a tendency to adversely affect the quality of the finished product.

This invention has as its principal object to provide a method of manufacturing vinyl resin films, particularly those of the acetal type, in which the film is brought to a condition in which it may be satisfactorily stripped from its film-forming surface under substantially the same conditions of temperature and tension as are now customarily employed in processes for the manufacture of film and sheeting from cellulose derivative materials. Another object is to provide a means of facilitating the removal of vinyl resin films or sheet from a film-forming surface and under minimum tension. A further object is to provide a method of making vinyl resin film and sheeting in which the material is not subjected to excessive stretching at the point of stripping. Other objects will appear hereinafter.

These objects are accomplished by the following invention which, in its broader aspects, comprises the deposition of a solution of an appropriate vinyl or other synthetic resin on the surface of a slowly rotating wheel or drum, the surface of which is coated with gelatin, and solidifying the material by removal of solvents therefrom. Preferably, the gelatin layer is maintained in a swollen condition by the occlusion or absorption of water. I have found that when a vinyl or similar synthetic resin solution is deposited on such a gelatin or swelled gelatin film-forming surface, the resinous material, notwithstanding its inherent tackiness and extreme tendency to stick to a surface on which it is cast from solution, loses substantially completely this tendency to cling to the film-forming surface. In fact, by depositing the film on the gelatin surface, particularly if the gelatin is in a swollen condition due to the presence therein of an appreciable amount of water, the resin film after evaporation of solvents can be very readily removed from the film-forming surface.

In the following examples and description I have set forth several of the preferred embodiments of my invention, but they are included merely for purposes of illustration and are not to be regarded as limitations thereof.

In the drawing:

Fig. 1 is a diagrammatic elevational sectional view of one type of apparatus by which my invention may be carried out.

Fig. 2 is a fragmentary view in partial section of the upper portion of the film-casting wheel shown in Fig. 1 and illustrating the manner in which the resin film-forming solution is deposited on the gelatin layer.

Referring to the drawing, the numeral 1 designates a conventional type of film-forming apparatus comprising the casting or coating wheel 2 mounted in suitable bearings 3. The wheel assembly is mounted on base 4 and is surrounded by wheel casing 5 which is provided with air inlet conduit 6 and air outlet conduit 7.

The numeral 8 designates a conventional type of dope hopper provided with adjustable gate member 9 for regulating the thickness of the dope stream which flows therefrom, adjustment being by means of thumb screw 10 attached in known manner to the gate member and threaded through one wall of the hopper.

Inlet conduit 6 is provided with air heater 11 and, if desired, also with an air filter (not shown) preceding the air heater.

Circulation of the heated air through the wheel casing is illustrated by the arrows, the air entering through conduit 6 and passing countercurrently to the direction of rotation of the wheel and finally leaving the apparatus through the conduit 7. The solvent-laden air passing out through conduit 7 may, if desired, be conveyed to a suitable solvent recovery system (not shown).

Numeral 12 designates a stripping roll to facilitate removal from the wheel surface of the solidified film F. Likewise, guide roll 13 facilitates passage of the film F to a series of conventional drying chambers 14 and 15. Chamber 14 is provided with air inlet conduit 16 and air outlet conduit 17 and with a series of rolls 18, 19, 20, 21, 22, and 23 over which the film passes.

Similarly chamber 15 is provided with rolls 24, 25, 26, 27, 28, and 29, over which the film passes on its way to the wind-up 30 which may, if desired, be housed in a separate compartment 31 access to which is given by means of hinged door 32. Chamber 15 is also provided with air inlet conduit 33 and air outlet conduit 34.

The numeral 35 designates a conduit for supplying a regulated amount of water to the surface of the wheel, the flow being controlled by valve 36. The numeral 37 designates a rubber-covered roll rotatably mounted (in suitable bearings, not shown) in contact with the surface of the wheel 2 to provide a means of backing up a small puddle of water emerging from the end of conduit 35. Numeral 38 is a squeegee roll also mounted in contact with wheel 2 similarly to roll 37 to provide a means of removing excess water from the wheel surface.

Operation of the apparatus will be apparent on inspection. As the wheel 2 rotates slowly in the direction indicated by the arrow, a solution or dope composed of an appropriate vinyl or other synthetic resin dissolved in a volatile solvent or solvent combination is fed from the hopper 8 to the surface of the wheel. The thickness of the dope stream is regulated by adjustment of the gate member 9 to give a film of appropriate eventual thickness, say of the order of .005 inch.

In accordance with my invention, the surface of the wheel is coated in known manner as indicated in Fig. 2 with a thin layer of gelatin having an approximate thickness of .003 inch, for example, this gelatin layer thus constituting the film-forming surface per se. Preferably, a fine stream of water is fed in regulated amount through the conduit 35 into the pocket formed between the rubber-covered roll 37 and the gelatin-surfaced wheel. This water penetrates into and swells the gelatin to a certain extent. Excess water is removed from the gelatin surface by means of the squeegee roll 38.

The film travels countercurrently to a current of warm air which passes into the apparatus from inlet conduit 6 and out by means of conduit 9. The casting wheel is heated to an appropriate temperature by heat acquired from the air current. The actual temperature employed will depend, not only upon the particular resin employed in the dope, but also upon the boiling point of the solvent or solvents employed. The practical upper limit of temperature will be somewhat below the boiling point of the solvent, since if the temperature were raised to or above the boiling point, the solvent would bubble and thus produce defects in the body of the film material.

Depending upon the type of film material being treated and various other factors, the wheel itself may be internally heated, if desired, although this is generally to be avoided because of the tendency of the resinous material to become adhesive.

As soon as the film meets the current of warm air passing through the wheel casing, it begins to set or harden by loss of solvent and as this setting action continues tends to cling more and more tenaciously to the wheel surface. However, and in accordance with my invention, the gelatin, especially when it is maintained in a swollen condition, prevents this action from taking place. At the stripping point, that is, at the stripping roll 12, it will be found that the film material can be readily stripped from the wheel surface. In fact, in some cases, the film will float freely from the film-forming surface when little or no tension is applied thereto.

What I claim is:

1. The continuous method of making a synthetic resin film or sheet which normally adheres tenaciously to metallic and other surfaces upon which it is cast from solution, which comprises depositing a solution of the resin in a volatile organic solvent in the form of a film on a film-forming surface composed of a permanent support having thereon a coating of gelatin maintained in a swollen condition by impregnation with water, solidifying the film by removing solvent therefrom while the film remains on the swollen gelatin surface and thereafter stripping the film from the swollen surface.

2. The continuous method of making a synthetic resin film or sheet which normally adheres tenaciously to metallic and other surfaces upon which it is cast from solution, which comprises depositing a solution of the resin in a volatile organic solvent in the form of a film on an endless, moving, film-forming surface composed of a permanent support having thereon a coating of gelatin swollen by impregnation with water, maintaining said gelatin surface in a swollen condition by continuous application of water thereto at at least one point in the travel of the film-forming surface, solidifying the film by removing solvent from the film while the film remains on the swollen gelatin surface and thereafter stripping the film from the swollen surface.

EMMETT K. CARVER.